Nov. 21, 1933.                C. F. LAUTZ                1,936,556
                                LINK
                          Filed Jan. 3, 1933
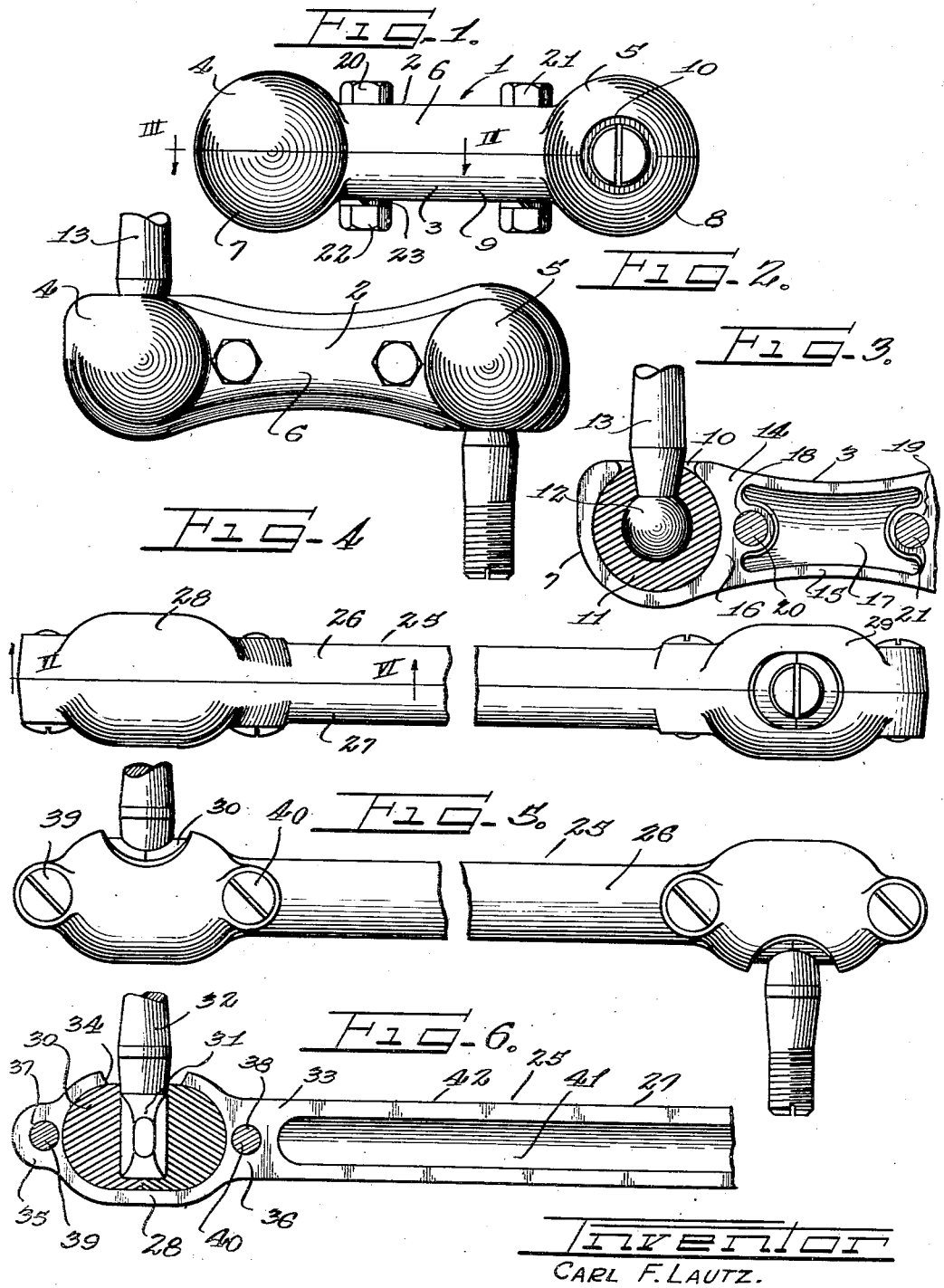
Inventor
CARL F. LAUTZ.

Patented Nov. 21, 1933

1,936,556

UNITED STATES PATENT OFFICE 1,936,556

LINK

Carl F. Lautz, Buffalo, N. Y., assignor to Houde Engineering Corporation, Buffalo, N. Y., a corporation of New York Application January 3, 1933. Serial No. 649,951

2 Claims. (Cl. 74—17)

This invention relates to a link and more particularly to a link such as is used in a shock absorber assemblage and commonly referred to as a drag link.

Links for this purpose have heretofore been made from complemental shell members provided with end sockets for receiving a ball of a ball stud or the like, with the shell members united by welding the peripheral edges or by interlocking flanges formed along these peripheral edges.

I have now found that for certain purposes a link of this type can be cheaply and satisfactorily made from forged or cast metal in relatively rigid longitudinally mated sections. Links of my present invention have the advantage of greater rigidity and greater strength than the usual links made of stamped metal. Furthermore, according to my present invention, the half sections of the link are secured together by means of bolts, screws or rivets rather than by welding and therefore can be more readily assembled in position in places without welding facilities.

It is therefore an object of my invention to provide a simple, strong and durable link that is of relatively inexpensive construction for use as a drag link in shock absorber assemblages and for other similar purposes.

It is a further important object of this invention to provide a link formed from forged metal in complemental mating sections adapted to be secured together by means of bolts, screws, rivets, or the like.

Other and further important objects of this invention will be apparent from the disclosures in the specification and the accompanying drawing.

This invention (in a preferred form) is illustrated in the drawing and hereinafter more fully described.

On the drawing:

Figure 1 is a plan view of a link embodying the principles of my invention.

Figure 2 is a similar view taken at right angles to that of Fig. 1.

Figure 3 is a fragmentary sectional view taken substantially along the line III—III of Figure 1 with parts in elevation.

Figure 4 is a broken plan view of a modified form of link.

Figure 5 is a similar view taken at right angles to that of Fig. 4.

Figure 6 is a fragmentary sectional view taken substantially along the line VI—VI of Fig. 4, with parts in elevation.

As shown on the drawing:

The reference numeral 1 in Figs. 1 to 3 inclusive indicates generally a link embodying the principles of my invention and suitable for use in a shock absorber assembly as a drag link, or for any purposes of a similar nature. Said link 1 comprises a pair of metal sections 2 and 3 which are preferably formed by a forging operation, although it will be understood that in some instances the sections may be cast. I prefer, however, to use a steel forging because of the greater strength and greater uniformity of a forging over a casting.

The half sections 2 and 3 are symmetrical about a longitudinal medial plane, such as a plane passing through the common surfaces when the two halves are assembled. The section 2 is provided at each end with a convexly curved portion that provides a segmental spherical end socket, as at 4 and 5 and is provided with an intermediate portion 6 having an outwardly convexed wall of substantially cylindrical form axially or longitudinally of the section. The section 3 is similarly formed with complementary socket portions 7 and 8 and intermediate portion 9, so that when assembled, substantially spherical end sockets are provided.

The socket portions 4 and 7, and 5 and 8, are provided with cut away portions, as at 10, to provide openings into the interior of the end sockets. Said cut away portions 10 are so arranged that the openings into the end sockets are formed on opposite sides of the link. A resilient bushing 11 is positioned within each of the end sockets for receiving the ball end 12 of a ball stud 13. The resilient bushing 11 is preferably formed of rubber and of a size and shape such that it conforms with the internal wall of the end socket and snugly fits therein when the two half sections are secured together.

The adjacent faces of the half sections 2 and 3 are provided with plane mating surfaces 14 made up of peripheral surfaces 15 that extend all around the edges of the half sections except for the openings 10 and transverse surface portions 16 which join the peripheral surface portions about the inner edges of the end socket portions. All parts of the mating surfaces 14, 15 and 16 of each half section 2 or 3 lie in the same plane or substantially so. Said surfaces may be slightly concave longitudinally of the half sections along the intermediate portion 9 so that when the sections are mated and secured together, contact will be assured along all of said mating surfaces.

The transverse surface portions 16 separate the end socket recesses from an intermediate recess 17 that extends for substantially the full length of the intermediate portion 9. Aligned apertures 18 and 19 are provided in each of the half sections 2 and 3 for receiving bolts 20 and 21 or other similar securing means, such as screws or rivets. The apertures 18 and 19 are surrounded by a portion of the plane mating surfaces 16 so that when the bolts 20 and 21 are secured in place and tightened up by means of nuts and lock washers 22 and 23, respectively, the common mating surfaces of the half sections 2 and 3 are brought into firm surface contact throughout their common area.

In assembling the link shown in Figs. 1 to 3 inclusive, a rubber bushing 11 is first positioned on each of the ball ends 12 of the ball stud 13 and the assembled stud and bushing is positioned with the bushing in one of the segmental spherical end sockets, with the shank of the stud extending freely through the cut away portion 10. The other half section is then brought into alignment and mated to enclose the assembled bushing and ball end. The bolts 20 and 21 are then inserted through the corresponding apertures 18 and 19 and the lock washers 23 and nuts 22 put on the extended ends of said bolts and tightened up. In completely assembled position, the half sections 2 are in common surface contact throughout their respective mating surfaces 14 and the rubber bushings 11 in the end sockets are held therein so tightly that no relative movement between the outer surfaces of said bushings 11 and the inner surfaces of the socket members is permitted.

In Figs. 4 to 6 inclusive there is shown a modified form of link 25 of similar construction. The link 25 comprises a pair of relatively elongated half sections 26 and 27 providing when assembled end sockets 28 and 29 that are oblate spheroidal in shape. Sectional resilient bushings 30 are adapted to be positioned within said end sockets and to receive a flattened head 31 of a stud member 32.

Each of the half sections 26 and 27 is provided with a plane mating surface 33 that extends along the peripheral edges of the sections and surrounds the socket portions except for the cut away portion 34. A somewhat enlarged surface portion is provided at each side of the segmental end sockets, as at 35 and 36, and apertures 37 and 38 extend through said portions 35 and 36 to receive the shank of bolts 39 and 40, respectively. The provision of these enlarged mating surface portions and of the substantially continuous peripheral surfaces assures that when the bolts 39 and 40 are tightened up, the half sections will be in firm surface contact throughout the common mating surfaces. The apertures 39 and 40 in the respective half sections 26 and 27 are, of course, properly aligned so that the segmental socket portions will be properly mated. A relatively long hollow portion 41 extends for substantially the length of the intermediate portion 42 between said end sockets so as to reduce the weight of the link without substantially lessening its strength.

It will thus be seen that I have provided a link that may be assembled readily by any unskilled mechanic and without the use of any welding or crimping equipment such as has heretofore been necessary in assembling stamped shell members used in links for similar purposes.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A link comprising half sections of rigid metallic construction having substantially coextensive mating surfaces extending about the peripheral edges thereof and having end recesses defining cavities when assembled for substantially totally enveloping resilient bushing members, an intermediate recess separated from said end recesses by transverse mating surfaces, and means extending through holes passing through said transverse surfaces to hold said half sections in assembled relation.

2. As an article of manufacture, a link construction including mating substantially half sections each of rigid material and having substantially coextensive mating surfaces, sphere-like pockets defined by the ends of said sections when secured together, and opening on opposite sides of the link, resilient ball-like bushings in and substantially enclosed by the pocket ends of said sections, and transverse fastening means for holding them in assembled relation.

CARL F. LAUTZ.